US006260879B1

(12) United States Patent
Stanley

(10) Patent No.: US 6,260,879 B1
(45) Date of Patent: Jul. 17, 2001

(54) AIR BAG SUPPRESSION SYSTEM USING A WEIGHT SENSOR, A SEAT BELT TENSION MONITOR, AND A CAPACITIVE SENSOR IN THE INSTRUMENT PANEL

(75) Inventor: James Greogroy Stanley, Novi, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/075,582

(22) Filed: May 11, 1998

Related U.S. Application Data
(60) Provisional application No. 60/046,168, filed on May 12, 1997.

(51) Int. Cl.[7] .................................................. B60R 21/32
(52) U.S. Cl. ............................ 280/735; 180/268; 701/45
(58) Field of Search ................................... 280/735, 734; 180/268; 340/667, 436; 73/862, 862.581, 862.68; 701/45

(56) References Cited

U.S. PATENT DOCUMENTS

| | | | |
|---|---|---|---|
| 3,889,529 | 6/1975 | Bradley | 73/141 R |
| 3,992,946 | 11/1976 | Bradley | 73/407 R |
| 4,021,057 | 5/1977 | Held et al. | 280/735 |
| 4,056,156 | 11/1977 | Dayton | 177/209 |
| 4,219,090 | 8/1980 | Dayton | 177/208 |
| 4,360,071 | 11/1982 | Dyck | 177/208 |
| 4,383,584 | 5/1983 | Dyck | 177/208 |
| 4,957,286 | 9/1990 | Persons, II et al. | 272/73 |
| 4,987,898 | 1/1991 | Sones | 128/645 |
| 5,117,373 | 5/1992 | Huff | 364/550 |
| 5,161,820 | 11/1992 | Vollmer | 280/730 |
| 5,232,243 | 8/1993 | Blackburn et al. | 280/732 |
| 5,337,238 | 8/1994 | Gioutsos et al. | 364/424.05 |
| 5,413,378 | 5/1995 | Steffens, Jr. et al. | 280/735 |
| 5,446,661 | 8/1995 | Gioutsos et al. | 364/424.05 |
| 5,454,591 | 10/1995 | Mazur et al. | 280/735 |
| 5,474,327 | 12/1995 | Schousek | 280/735 |
| 5,490,069 | 2/1996 | Gioutsos et al. | 364/424.05 |
| 5,525,843 | 6/1996 | Howing | 307/9.1 |
| 5,573,269 | 11/1996 | Gentry et al. | 280/735 |
| 5,606,516 | 2/1997 | Douglas et al. | 364/571.04 |
| 5,626,359 | * 5/1997 | Steffens, Jr. et al. | 280/735 |
| 5,722,686 | 3/1998 | Blackburn et al. | 280/735 |
| 5,739,757 | * 4/1998 | Gioutsos | 280/735 |

OTHER PUBLICATIONS

UniForce Technical Notes and Sensor Design Guide, 3424 Touhy Avenue, Chicago, IL 60645–2717, pp. 1 through 9.
IMRC Prescon Sensors with Low Threshold Actuation, International Microelectronics Research Corporation, 11132 E. Edison St., Tucson AZ 85749–9773, pp. 1 thru 3 also 3 usage and application pages.
FSR Integration Guide & Evaluation Parts Catalog with Suggested Electrical Interfaces, Interlink Electronics, 546 Flynn Road, Camarillo, CA 90313, pp. 1 through 27.
UniForce Technical Notes #101 (Rev. 7/95), Force Imaging Technologies, 3424 Touhy Avenue, Chicago, IL 60645–2717, pp. 1 through 4.
Tactile Sensing, 1990's Style by Wesley R. Iversen, Assembly Magazine, Feb.–Mar. 1993 Issue, pp. 23 through 26.

* cited by examiner

Primary Examiner—Eric Culbreth
(74) Attorney, Agent, or Firm—Dinnin & Dunn P.C.

(57) ABSTRACT

A system and method for controlling the inflation of an air bag in a vehicle utilizes a seat weight sensor, a seat belt tension measurement sensor, and a capacitive position sensing sensor. The capacitive sensor is mounted at a point relative to an air bag inflator door and responsive to the proximity thereto of an object to be sensed. An air bag control processor operatively coupled to a plurality of air bag squibs is provided for controlling the inflation of the air bag responsive to the force exerted on the vehicle seat, the tension sensed in the seat belt, and the proximity of an object or occupant to the inflator door.

12 Claims, 2 Drawing Sheets

AIR BAG SUPPRESSION SYSTEM USING A WEIGHT SENSOR, A SEAT BELT TENSION MONITOR, AND A CAPACITIVE SENSOR IN THE INSTRUMENT PANEL

CROSS REFERENCE TO RELATED APPLICATIONS

The instant application claims the benefit of copending U.S. Provisional Application Ser. No. 60/046,168, filed May 12, 1997.

Co-pending U.S. Application Ser. No. 08/993,701 entitled "Seat Weight Sensor Having Fluid Filled Bladder", filed on Dec. 18, 1997, claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. U.S. Application Ser. No. 08/993,701 also discloses a load distributor for distributing loads across the load bearing surface of the hydrostatic weight sensor. U.S. Application Ser. No. 08/993,701 and U.S. Provisional Application Ser. No. 60/032,380 are incorporated herein by reference.

Co-pending U.S. Application Ser. No. 09/003,672 entitled "Automotive Seat Weight Sensing System", filed on Jan. 7, 1997, claiming benefit of U.S. Provisional Application Ser. No. 60/034,018 filed on Jan. 8, 1997, and assigned to the assignee of the instant invention discloses a seat weight sensing system comprising a plurality of hydrostatic weight sensors each of which is in accordance with U.S. Application Ser. No. 08/993,701. U.S. Application Ser. No. 09/003,672 and U.S. Provisional Application Ser. No. 60/034,018 are incorporated herein by reference.

Co-pending U.S. Application Ser. No. 09/003,870 entitled "Vehicle Seat Sensor Having Self-Maintaining Air Bladder", filed on Jan. 7, 1997, claiming benefit of U.S. Provisional Application Ser. No. 60/035,343 filed on Jan. 16, 1997, and assigned to the assignee of the instant invention discloses an apparatus for automatically maintaining the supply of sensing fluid in a hydrostatic weight sensor. U.S. Application Ser. No. 09/003,870 and U.S. Provisional Application Ser. No. 60/035,343 are incorporated herein by reference.

Co-pending U.S. Application Ser. No. 09/003,868 entitled "Seat Weight Sensor with Means for Distributing Loads", filed on Jan. 7, 1997, claiming benefit of U.S. Provisional Application Ser. No. 60/058,084 filed on Sep. 4, 1997, and assigned to the assignee of the instant invention discloses a load distributor for distributing sensed load across the load bearing surface of a hydrostatic weight sensor. U.S. Application Ser. No. 09/003,868 and U.S. Provisional Application Ser. No. 60/058,084 are incorporated herein by reference.

Co-pending U.S. Application Ser. No. 09/003,673 entitled "Seat Weight Sensor Having Self-Regulating Fluid Filled Bladder", filed on Jan. 7, 1997, claiming benefit of U.S. Provisional Application Ser. No. 60/058,119 filed on Sep. 4, 1997, and assigned to the assignee of the instant invention discloses a hydrostatic weight sensor having a means for automatically regulating the amount of sensing fluid therein. U.S. Application Ser. No. 09/003,673 and U.S. Provisional Application Ser. No. 60/058,119 are incorporated herein by reference.

Co-pending U.S. Application Ser. No. 09/003,746 entitled "Seat Weight Sensor Using Fluid Filled Tubing", filed on Jan. 7, 1997, claiming benefit of U.S. Provisional Application Ser. No. 60/065,986 filed on Nov. 14, 1997, and assigned to the assignee of the instant invention discloses a hydrostatic weight sensor incorporating a fluid filled tube. U.S. Application Ser. No. 09/003,746 and U.S. Provisional Application Ser. No. 60/065,986 are incorporated herein by reference.

Co-pending U.S. Application Ser. No. 09/003,744 entitled "Low Profile Hydraulic Seat Weight Sensor", filed on Jan. 7, 1997, claiming benefit of U.S. Provisional Application Ser. No. 60/065,832 filed on Nov. 14, 1997, and assigned to the assignee of the instant invention discloses a hydrostatic weight sensor constructed from plates or sheets of semi-rigid material and filled with a liquid, grease, Bingham fluid or thixotropic material. U.S. Application Ser. No. 09/003,744 and U.S. Provisional Application Ser. No. 60/065,832 are incorporated herein by reference.

Co-pending U.S. Application Ser. No. 09/075,584, hereinafter "Application ASL-177-US", entitled "Seat Belt Tension Prediction System Using an Accelerometer Mounted To The Seat Frame and a Weight Sensor" filed on May 11, 1998, claiming benefit of U.S. Provisional Application Ser. No. 60/046,233 filed on May 12, 1997, and assigned to the assignee of the instant invention discloses a seatbelt tension prediction system and method utilizing a seat weight sensor and an accelerometer. Application ASL-177-US and U.S. Provisional Application Ser. No. 60/046,233 are incorporated herein by reference.

Co-pending U.S. Application Ser. No. 09/075,729, hereinafter "Application ASL-179-US", entitled "Belt Tension Device Using A Bend Sensor" filed on May 11, 1998, claiming benefit of U.S. Provisional Application Ser. No. 60/046,227 filed on May 12, 1997, and assigned to the assignee of the instant invention discloses a seatbelt tension measurement system employing a bend sensor to determine displacement of a device caused by a high tension seat belt. Application ASL-179-US and U.S. Provisional Application Ser. No. 60/046,227 are incorporated herein by reference.

Co-pending U.S. Application Ser. No. 08/911,148, entitled "Electric Field Sensing Air Bag Danger Zone Sensor" filed on Aug. 14, 1997, claiming benefit of U.S. Provisional Application Ser. No. 60/038,620 filed on Mar. 7, 1997, and assigned to the assignee of the instant invention discloses a position sensing system for determining the presence and position of a vehicle occupant for purposes of influencing the decision to deploy a safety restraint system in response to a vehicle crash. U.S. Application Ser. No. 08/911,148 and U.S. Provisional Application Ser. No. 60/038,620 are incorporated herein by reference.

TECHNICAL ART

The instant invention relates generally to automotive passenger restraint systems and more specifically to a system and method for controlling the inflation of an air bag in occupant seating situations where the passenger is at risk of injury from deployment thereof.

BACKGROUND OF THE INVENTION

Automotive manufacturers and the National Highway Transportation Safety Association are investigating methods to disable vehicle air bags in situations where they may cause more harm than good. Typically, airbags have been developed to deploy with enough force to restrain a 175 lb. adult in a high velocity crash. Deployment of the same air bags when infants or children are seat occupants may cause serious injury due to the force generated upon inflation of the bag. This invention can be used to disable a passenger side air bag when infants or children are present in the passenger seat.

Another potentially harmful occupant seating situation is when the occupant is in close proximity to the air bag inflator door at the time of air bag deployment. Recent National Highway Transportation Safety Association data suggests that severe injuries caused by the air bag can be minimized or eliminated if the air bag is disabled when the occupant is closer than approximately four inches from the inflator door. The present invention may be used to detect a human body part that is within a "danger zone" around the air bag inflator assembly at the time of impact such that the air bag could be disabled or its inflation profile could thereby be reduced. Furthermore, the invention can be used to disable the passenger side air bag in nearly all occupant seating situations where air bag deployment is hazardous.

The present invention comprises a seat weight sensor, a seat belt tension sensor, and a capacitive sensor located in the instrument panel or dashboard near the air bag inflator door for sensing the proximity of a human to the air bag deployment danger zone.

The seat weight sensor and the seat belt tension measurement sensor are employed in concert to determine if the occupant is large enough for safe air bag deployment. The capacitive sensor operates independently of the aforementioned sensors to disable the air bag when a human presence is detected too close to the air bag inflator door just prior to air bag deployment.

Seat weight sensors are being developed to determine when the passenger seat occupant is sufficiently small to require the disablement of an air bag inflator. Such sensors should ideally be capable of determining when the child is in a rear facing infant seat, a forward facing child seat or a booster seat. Occupant weight measurement in child seat occupant situations is complicated by the force exerted downwardly on the seat by seat belt tension. A tightly belted child seat increases the measured weight or force exerted on the seat, possibly causing air bag deployment on children or infants.

Prior art systems using multiple sensor technologies have been developed to inhibit air bag deployment in dangerous situations. Sensors such as infra-red sensors, passive infra-red sensors (heat detectors), ultrasonic sensors, capacitive sensors, weight sensors, and child seat "tag" sensors have previously been employed. A plurality of the aforementioned sensors have been used together in an attempt to identify child seats, small occupants, empty seats, large occupants and out-of-position occupants. Generally, the greater number of sensors employed, the better the system performance. However, the cost of systems that use numerous sensors is prohibitive and vehicle assembly is complex.

The instant invention incorporates a belt tension measurement system to identify the situations where child seats are belted tightly to the seat. Since normally seated adults are generally uncomfortable when seat belt tension exceeds ten pounds, a seat belt tension measurement greater than ten pounds indicates that the occupant is not a normally seated adult. In the aforementioned situation where the seat belt is under high tension, the air bag is safely disabled.

Correspondingly, when the seat belt tension is low, the force exerted on the seat as measured by the weight sensor is not greatly influenced by seat belt tension thereby allowing the weight sensor measurement to determine the weight of the occupant. Where low belt tension exists, the air bag is enabled when a relatively large weight is present and disabled when a weight below a predetermined threshold is sensed. An air bag having variable inflation characteristics can be tailored to inflate at a rate corresponding to the measured weight of the occupant.

Air bags can also prove hazardous to passengers located too close to the inflator at the time of vehicle impact, particularly where the occupant is unbelted and experiences severe pre-impact braking. A capacitive, or electric field, sensor detects the presence of a passenger near the inflator door quickly enough to disable the air bag while the passenger is still "flying" through the air during a pre-impact breaking event, thereby protecting an out of position occupant from the force generated by air bag deployment.

SUMMARY OF THE INVENTION

The instant invention provides a system and method for controlling the deployment of a vehicle air bag utilizing a seat weight sensor, a seat belt tension measurement sensor, and a capacitive sensor operatively coupled to an air bag control processor. The instant invention measures three crucial criteria for safe air bag deployment: the weight of a vehicle seat occupant, the tension present in the seat belt, and the occupant's proximity to the air bag inflator door. By continuously monitoring and evaluating the aforementioned criteria, the instant invention provides for safe and predictable deployment of a vehicle air bag in all occupant situations.

Detection of the presence of infant seats, children, and small adults is necessary to inhibit air bag deployment in situations where the seat occupant is at risk of injury from air bag inflation. Occupants below a threshold weight have a high risk of injury from the deployment of an air bag. Similarly, occupants who are in close proximity to the air bag inflator door at the time of deployment are also likely to be injured. Accordingly, a system for controlling air bag inflation that accurately determines both occupant size and position is advantageous.

A weight sensor is provided to determine the force exerted by a seat occupant downwardly on the seat of the vehicle. The force exerted downwardly onto the vehicle seat is generally comprised of two components:

the force attributable to the mass of the occupant, and the force attributable to the tension present in the vehicle seat belt. Accordingly, a seat belt tension measurement sensor is provided to determine the amount of force acting downwardly on the vehicle seat as a result of seat belt tension. The tension in the seat belt as measured by the seat belt tension sensor provides an indication of the presence of a tightly belted child seat or other object.

Additionally, a capacitive or electric field sensor is provided to determine whether an occupant is proximate the air bag door at the time of air bag deployment. The capacitive sensor is provided with a pair of spaced conductive electrodes having a dielectric therebetween and a means for measuring capacitance. The value of capacitance of the sensor varies with the value of the dielectric material disposed between the electrodes. The capacitive sensor is positioned at a point relative to the air bag inflator door such that an occupant within a predetermined distance, i.e., the "danger zone" of the air bag inflator door, changes the dielectric constant of the sensor and thereby varies the capacitance thereof.

The human body has a relatively high effective dielectric constant that is readily detected by the capacitive sensor. Additionally, items such as newspapers do not greatly influence the dielectric constant between the spaced conductive electrodes and may thereby be distinguished from an occupant.

Furthermore, the capacitive sensor has the ability to detect an unbelted occupant entering the danger zone of the air bag inflator door as the occupant is thrown forward from the force of severe braking. Prior art systems utilizing only seat weight and belt tension sensors are incapable of determining whether an occupant is out of position, thereby allowing air bag inflation even when occupants are at risk of injury.

An airbag control processor operatively coupled to the aforementioned sensors is provided to inhibit the deployment of the air bag upon detection of the appropriate occupant situation. For example, seat belt tension in excess of 10 lbs. is generally uncomfortable for adult occupants. When the seat belt tension measurement is below a predetermined threshold (10 lbs.), and the seat weight measurement is below a predetermined threshold indicating the presence of a small occupant in the vehicle seat, the air bag control processor disables the output signal to the electro-explosive squibs that deploy the bag.

Additionally, when seat belt tension is determined to be high, indicating a tightly belted infant seat or other object, the processor disables the air bag. Furthermore, the processor disables the air bag under any combination of weight and seat belt tension conditions if an occupant is detected within the danger zone of the air bag inflator door.

Many prior art air bag control systems use complex algorithms to predict occupant position to compensate for the lack of direct sensory information to the control system. These algorithms suffer from the disadvantage that their performance is not consistently predictable. The instant invention utilizes direct physical sensor information in a simple algorithm to determine whether to deploy an airbag.

The weight sensor also provides an output signal operatively coupled to the air bag control system for controlling an air bag inflator having variable inflation characteristics. When an occupant weighing greater than the minimum threshold but less than a predetermined maximum threshold is present, thereby indicating an occupant of small stature, the inflation profile of the air bag is thereby reduced accordingly by providing an output signal to only a single squib, for example, in a multiple stage air bag inflator.

Therefore, one object of the instant invention is to provide an air bag suppression system that monitors and evaluates occupant weight, seat belt tension, and occupant proximity to the air bag inflator prior to deployment of the air bag. Deployment decisions based on the three aforementioned criteria provide a system that can reliably detect the presence of a passenger at risk of injury from air bag deployment.

Yet another object of the instant invention is to provide an air bag suppression system that detects the presence of a child seat by utilizing a weight sensor in conjunction with a seat belt tension sensor. Prior art systems that rely solely on seat weight measurements often misdiagnose the presence of child seats due to the force exerted on the seat weight sensor by a tight seat belt.

Yet another object of the instant invention is to provide a system and method for air bag suppression that employs direct sensor measurements in a simple algorithm to determine whether to deploy an air bag. The instant invention obviates the need for complex probabilistic algorithms thereby providing predictable system performance.

A yet further object of the instant invention is to provide a system for air bag suppression utilizing a minimum of components to reduce vehicle assembly complexity and cost.

The instant invention will be more fully understood after reading the following detailed description of the preferred embodiment with reference to the accompanying drawings. While this description will illustrate the application of the instant invention in an automotive safety restraint system, it will be readily understood by one of ordinary skill in the art that the instant invention may also be utilized in other passenger restraint control systems.

DETAILED DESCRIPTION OF THE PREFERRED EMBODIMENTS

Figure 1:
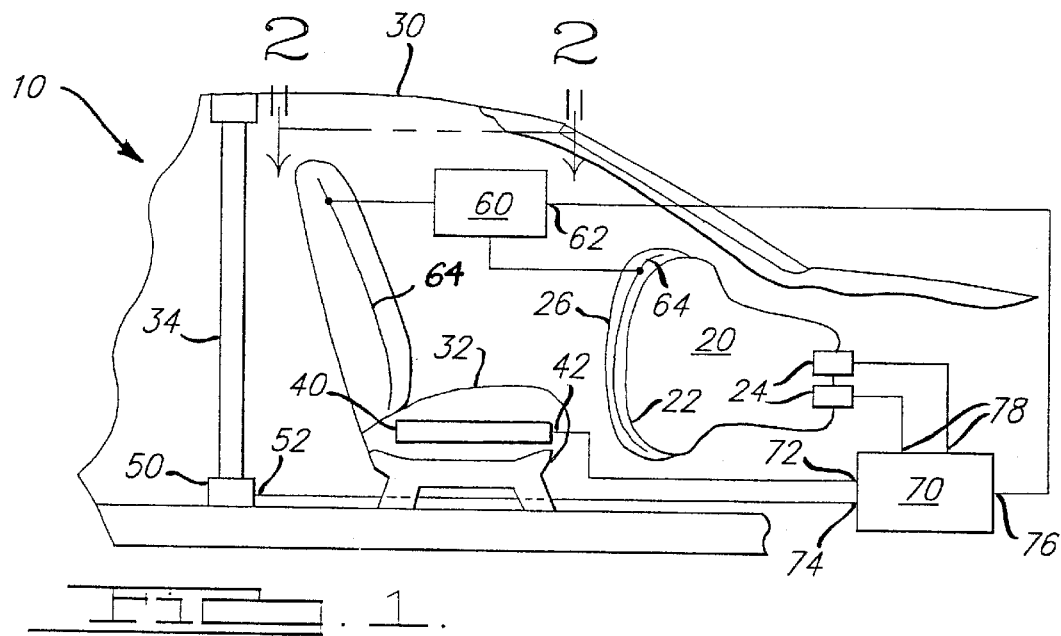
FIG. 1 is a diagrammatical view of a preferred embodiment of the instant invention.

Referring to FIG. 1, a system 10 operatively coupled to an air bag control system 20 for controlling the inflation of an air bag 22 in a vehicle 30 having a vehicle seat 32 and a seat belt 34 comprises a seat weight sensor 40, a seat belt tension sensor 50, and a capacitive sensor 60 for sensing occupant position. An air bag control system processor 70 has a plurality of inputs 72, 74, and 76 operatively coupled to the weight sensor 40, the seat belt tension sensor 50, and the capacitive sensor 60, respectively. The processor 70 is further provided with a plurality of output signals 78 operatively coupled to a plurality of air bag squibs 24 to provide sufficient electrical current for the ignition thereof.

Figure 2:
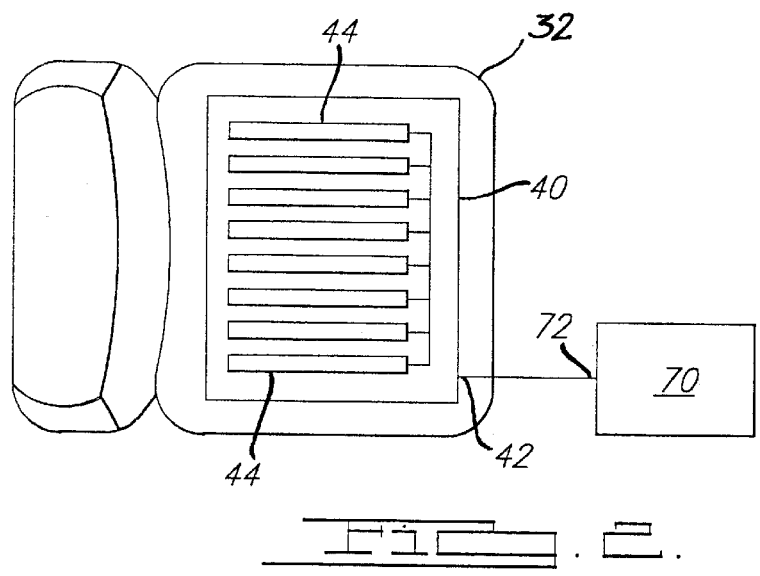
FIG. 2 is a view of the instant invention taken along the line 2—2 of FIG. 1.

The seat weight sensor 40 generates an output signal 42 responsive to the force exerted downwardly on the seat 32 and operatively coupled to the input 72 of the processor 70. For example, and as shown in FIG. 2, the seat weight sensor 40 can comprise a plurality of force sensitive resistive elements 44 disposed within the vehicle seat 32 for measuring force. The force sensitive resistive elements 44 provide as an output signal 42 a variable electrical resistance responsive to the force exerted on the elements 44, operatively coupled to the input 72 of processor 70. The variable resistance output signal 42 is generally inversely proportional to the amount of force acting on the seat 32.

Figure 5:
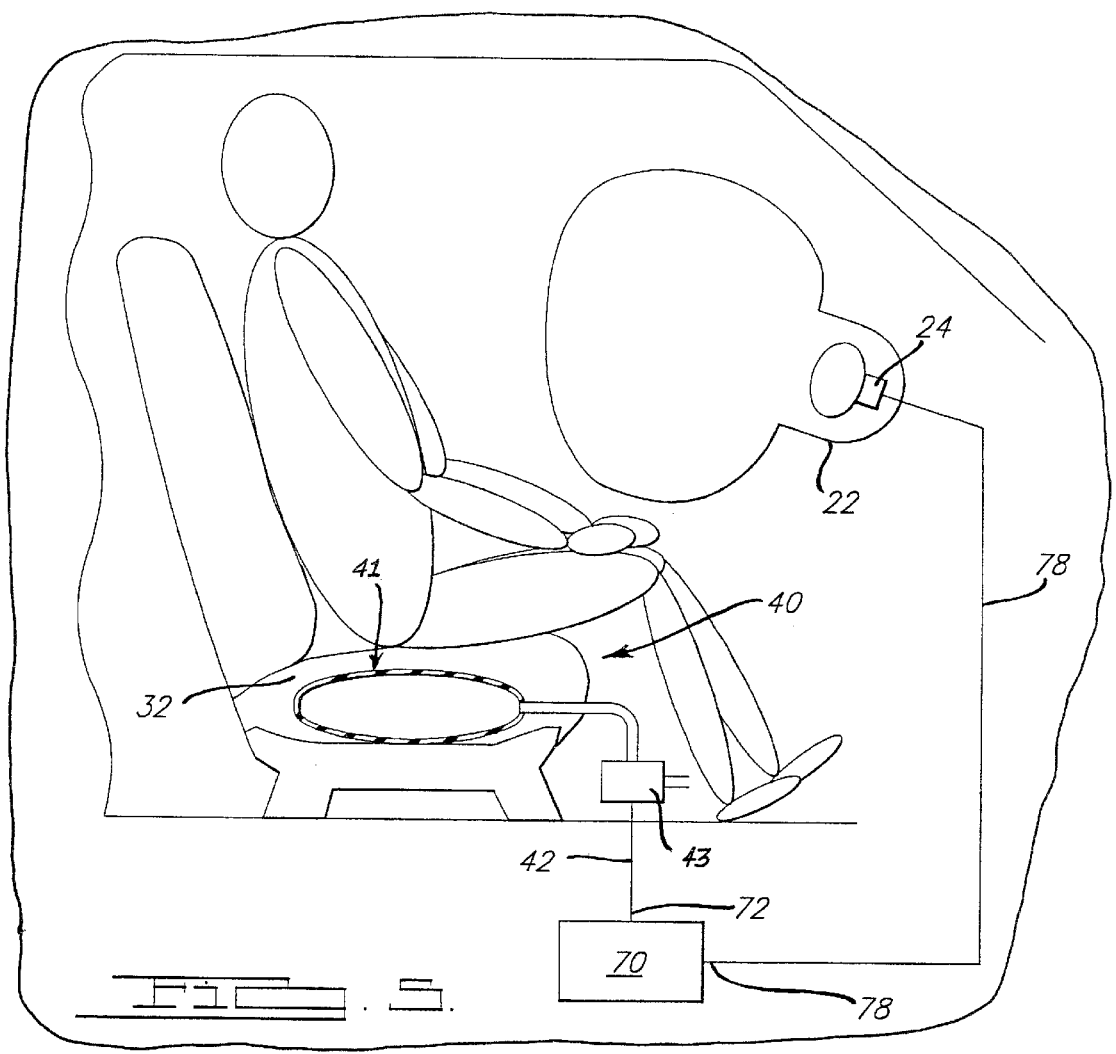
FIG. 5 is a schematic view of a seat weight sensor in accordance with the instant invention.

As disclosed in U.S. Application Ser. No. 08/993,701, now U.S. Pat. No. 5,957,491 and as shown in FIG. 5 a hydrostatic seat weight sensor 40 in accordance with the instant invention comprises a gas filled bladder 41 disposed within the vehicle seat 32 and a differential pressure sensor 43 operatively coupled to the bladder 41 for measuring the difference in pressure between the bladder and the atmosphere. The differential pressure sensor 43 provides a weight sensor output signal 42 that is responsive to the force exerted downwardly on the seat 32. The sensor output signal 42 is operatively coupled to the input 72 of processor 70 thereby providing a measure of the force acting downwardly on the seat 32.

Referring to FIG. 1, the seat belt tension sensor 50 measures tensile force in seat belt 34 and generates an output signal 52 responsive thereto. As taught in copending U.S. Application Ser. No. 09/075,729, filed May 11,1998, the seat belt tension sensor 50 can comprise a bend sensor 50, shown schematically in FIG. 1, having a variable electrical resistance output signal 52 responsive to the change in the radius of curvature of a sensor material secured to a flat spring. As tension in the seat belt 34 increases, the flat spring is bent downwardly thereby causing a change in the radius of curvature of the sensor material secured thereto and the electrical resistance as measured at the output signal 52.

Alternatively, a seat belt tension sensor 50 shown schematically in FIG. 1, can comprise a Villari effect tension sensor as disclosed in copending U.S. Provisional Application Ser. No. 60/067,071 herein incorporated by reference and copending U.S. Provisional Application Ser. No. 60/070,319 herein incorporated by reference, both assigned to the assignee of the instant invention.

The Villari effect refers to the magnetic permeability responsive to compression or tensile stresses of certain materials with magnetostrictive properties. By measuring the magnetic field strength in magnetostrictive material placed in line with a seat belt mechanism, for example in a seat belt latch or a seat belt retractor, the relative tension in the belt may be calculated.

The capacitive sensor 60, for example as taught in U.S. Pat. No. 5,722,686 by Blackburn et al., comprises a pair of spaced electrically conductive electrodes 64 having a dielectric therebetween and a means for measuring the capacitance between the electrodes 64. Referring to FIG. 1, the capacitive sensor 60 generates an electromagnetic field between the spaced electrodes 64 and generates an output signal 62 responsive to the amount of capacitance sensed therebetween. The spaced electrodes 64 are mounted at a point relative to an air bag inflator door 26 such that the effective dielectric between the spaced electrodes 64 is air. An occupant within the electromagnetic field between the electrodes 64 affects the dielectric constant of the capacitive sensor 60, thereby varying the capacitance thereof as measured at the output signal 62.

The presence of an occupant between the spaced electrodes 64 of the capacitive sensor 60 effectively increases the dielectric constant therebetween. As the dielectric constant increases, the capacitance between the electrodes 64 increases thereby providing a measure of the proximity of an occupant to the inflator door 26. When the capacitance between the electrodes 64 as measured by the sensor 60 reaches a predetermined level, the sensor 60 generates the output signal 62 responsive thereto. The processor 70 then inhibits the deployment of the air bag 22 to prevent injury of an occupant near the inflator door 26.

Figure 3:
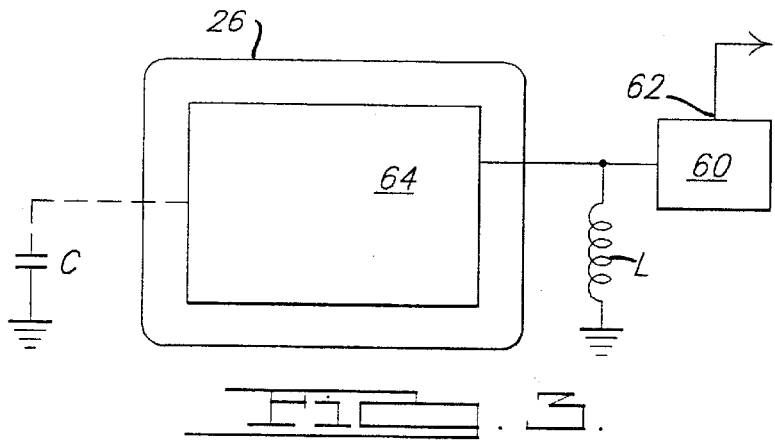
FIG. 3 is a diagrammatical view of a capacitive sensor in accordance with the instant invention.
Figure 4:
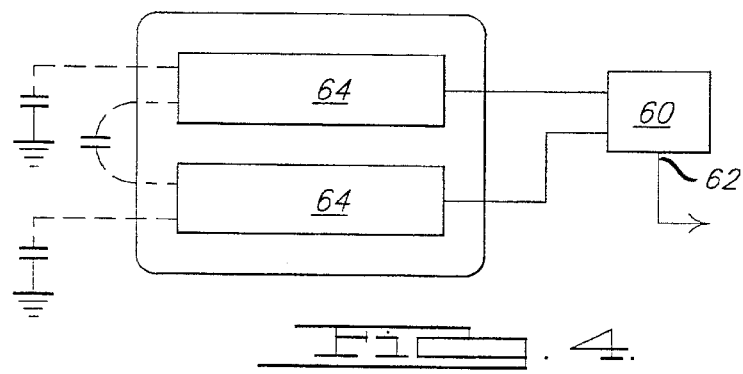
FIG. 4 is a diagrammatical view of an alternative capacitive sensor in accordance with the instant invention.

The aforementioned capacitive sensing method is also generally known in the art as electric field sensing, wherein the presence of a conductive or dielectric object is sensed. The human body has conductive and dielectric properties such that any part of the body in close proximity to the sensor will be detected. If the spaced conductive electrodes 64 are located on, or very near to, the air bag inflator door 26, the danger zone of the air bag 22 can be constantly monitored. The response of the sensor is rapid enough to disable the air bag if the occupant enters the danger zone immediately prior to a vehicle impact, which could happen during pre-impact braking. FIGS. 3 and 4 illustrate various configurations for the location of the capacitive sensor 60 conductive electrodes 64 within the scope of the instant invention.

In FIG. 3, the sensor electrode 64 configuration comprises a single electrode 64 positioned proximate the inflator door which exhibits a stray capacitance relative to ground potential. The capacitance of this sensor electrode 64 configuration is influenced by the proximate presence of either dielectric or conductive objects and is detected using circuitry known to those of ordinary skill in the art. For example, in accordance with the devices illustrated in U.S. Pat. No. 645,576, the single electrode sensor configuration is connected to an inductor L to form a series resonant LC circuit. The capacitive sensor 60 further comprises an associated detector circuit either conductively or magnetically linked to the LC circuit that produces an excitation signal which causes the associated LC circuit of inductor (L) and capacitor (C) to resonate. The resonant frequency is then measured by the associated detector circuit, and communicated to the processor 70 by output signal 62 in units of either frequency, distance, or some other quantity associated with the proximate distance of the object to be sensed.

In FIG. 4, the sensor electrode 64 configuration comprises a plurality of electrodes 64 which exhibit both inter-electrode capacitance and individual capacitance relative to ground, whereby the proximate presence of an object influences the value of the associated capacitance in relation to the proximity of the object. The sensor electrode 64 configuration is connected to the associated sensor 60 module which senses, using circuitry known to those of ordinary skill in the art, the effect of the inter-electrode capacitance and generates an output signal 62 associated with the proximity of the sensed object to the sensor electrodes 64.

In operation, the processor 70 is adapted to monitor the output signal 42 from the seat weight sensor 40, the output signal 52 from the seat belt tension sensor 50, and the output signal 62 from the capacitive sensor 60. If the output signal 62 generated by the capacitive sensor 60 indicates the presence of an occupant within a predetermined distance of the air bag inflator door 26, the processor 70 inhibits the inflation of the air bag 22 by disabling the plurality of output signals 78 supplying firing current to the air bag squibs 24 without regard to the status of the seat weight sensor 40 or the seat belt tension sensor 50.

Alternatively, when no occupant is sensed within the air bag deployment danger zone by the capacitive sensor 60, the processor 70 allows air bag deployment by enabling the plurality of output signals 78 when seat belt 34 tension as measured at the output signal 52 is below a predetermined threshold and the seat weight as measured at the output signal 42 of the seat weight sensor 40 is above a predetermined threshold.

Inflation of the air bag 22 is always inhibited by the processor 70 when the seat belt tension is above a predetermined threshold thereby indicating the presence of a tightly belted child seat or other inanimate object. Additionally, air bag 22 inflation is inhibited when the seat belt tension is below a predetermined threshold and the force exerted on the seat 32 as measured by the seat weight sensor 40 is also below a predetermined threshold thereby indicating the presence of a small occupant at risk of injury from air bag 22 deployment.

The instant invention provides the ability to tailor the inflation profile of the air bag 22 responsive to a sensed occupant at risk from full inflation thereof where the air bag control system 20 is equipped for variable inflation. When the seat weight sensor 40 measures a force exerted on the seat 32 above the predetermined minimum threshold required for air bag 22 inflation and below a predetermined maximum threshold indicating a small occupant in the seat 34, the processor 70 disables one of the plurality of output signals 78 supplying firing current to the air bag squibs 24, thereby reducing the force with which the air bag 22 is deployed.

The instant invention would be useful and beneficial on both the driver and the passenger side. On the driver side, this invention could be especially effective in the situations where the driver is relatively short and sits very close to the steering wheel (and its air bag) in order to reach the pedals. Occupants on both the driver and the passenger side would benefit when they are within the danger-zone at the time of impact. This system could achieve significant safety improvements in cases where the crash sensing algorithm is so inferior that many normally seated occupants are severely out of position because the crash sensor's deployment command was far too late.

One of ordinary skill in the art will appreciate that the measurement of a physical quantity such as distance or capacitance in the context of the instant invention does not require that the actual distance in units of length, or capacitance in units of farads, be measured in order to practice the instant invention. Instead, the actual sensed quantity could be of different physical units, such as frequency, voltage, or current, whereby the sensed quantity varies in response to actual variations in distance of the object to be sensed.

One of ordinary skill in the art will further appreciate that distances measured by a position sensor may be transformed to corresponding distances relative to any point of reference which position is known relative to the associated position sensor.

While specific embodiments of the instant invention have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. An apparatus for controlling the inflation of an air bag having an air bag door, in a vehicle having a seat and a seat belt comprising:

a.) a seat weight sensor having an output signal responsive to a force exerted on the seat;

b.) a seat belt tension sensor having an output signal responsive to a tension in the seat belt, said seat belt tension sensor comprising a bend sensor;

c.) a capacitive sensor having spaced electrically conductive electrodes mounted at a point relative to the air bag door and having a dielectric disposed therebetween and an output signal responsive to the proximity of an occupant thereto; and d.) an air bag control system comprising a microprocessor having a first input operatively coupled to the output signal of said seat weight sensor, a second input operatively coupled to the output signal of said seat belt tension sensor, a third input operatively coupled to the output signal of said capacitive sensor, and a plurality of output signals for controlling the inflation characteristics of said air bag responsive to said seat weight sensor, said seat belt tension sensor, and said capacitive sensor.

2. The system of claim 1 wherein said capacitive sensor further comprises a plurality of spaced conductive electrodes mounted at a point relative to the air bag door.

3. The system of claim 1 wherein the seat weight sensor comprises a plurality of force sensitive resistive elements disposed within the vehicle seat.

4. The system of claim 1 wherein said seat weight sensor comprises a fluid filled bladder disposed within the vehicle seat.

5. An apparatus for controlling the inflation of an air bag having an air bag door, in a vehicle having a seat and a seat belt comprising:

a.) a seat weight sensor having an output signal responsive to force exerted on the seat;

b.) a seat belt tension sensor having an output signal responsive to a tension in the seat belt, said seat belt tension sensor comprising a Villari effect sensor;

c.) a capacitive sensor having spaced electrically conductive electrodes mounted at a point relative to the air bag door and having a dielectric disposed therebetween and an output signal responsive to the proximity of an occupant thereto; and d.) an air bag control system comprising a microprocessor having a first input operatively coupled to the output signal of said seat weight sensor, a second input operatively coupled to the output signal of said seat belt tension sensor, a third input operatively coupled to the output signal of said capacitive sensor, and a plurality of output signals for controlling the inflation characteristics of said air bag responsive to said seat weight sensor, said seat belt tension sensor, and said capacitive sensor.

6. A method of controlling the inflation of an air bag having an air bag door in a vehicle having a seat, a seat belt, a seat weight sensor having an output signal responsive to a force exerted on the vehicle seat, a seat belt tension sensor having an output signal responsive to a tension in the seat belt, a capacitive sensor mounted relative to the air bag door having an output signal responsive to the proximity of an occupant thereto, and an air bag control system operatively coupled to a plurality of air bag squibs comprising:

a.) determining the force exerted on the seat of said vehicle;

b.) determining the tension in the seat belt of said vehicle;

c.) determining the proximity of an occupant to the air bag door;

d.) inhibiting the inflation of said air bag when the proximity of the occupant to the air bag door is below a predetermined threshold; and e.) inhibiting the inflation of said air bag when seat belt tension is above a predetermined threshold.

7. The method of controlling the inflation of an air bag as recited in claim 6 further comprising inhibiting the inflation of said air bag when the force exerted on the vehicle seat is below a predetermined threshold.

8. The method of controlling the inflation of an air bag as recited in claim 6 further comprising disabling at least one of the plurality of air bag squibs when the force exerted on the vehicle seat is above a minimum predetermined threshold and below a maximum predetermined threshold.

9. The method of controlling the inflation of an air bag as recited in claim 6 further comprising inhibiting the inflation of said air bag when the force exerted on the vehicle seat is below a minimum predetermined threshold.

10. The method of controlling the inflation of an air bag as recited in claim 9 further comprising disabling at least one of the plurality of air bag squibs when the force exerted on the vehicle seat is above the minimum predetermined threshold and below a maximum predetermined threshold.

11. The method of controlling the inflation of an air bag as recited in claim 6 further comprising disabling at least one of the plurality of air bag squibs when the force exerted on the vehicle seat is above a minimum predetermined threshold and below a maximum predetermined threshold.

12. The method of controlling the inflation of an air bag as recited in claim 6, further comprising disabling at least one of the plurality of air bag squibs when the force exerted on the vehicle seat is above a minimum predetermined threshold and below a maximum predetermined threshold.

* * * * *